F. N. CRONHOLM.
LOCKING MEANS FOR GATES OF IRRIGATING CANALS.
APPLICATION FILED AUG. 28, 1913.
1,095,455.
Patented May 5, 1914.
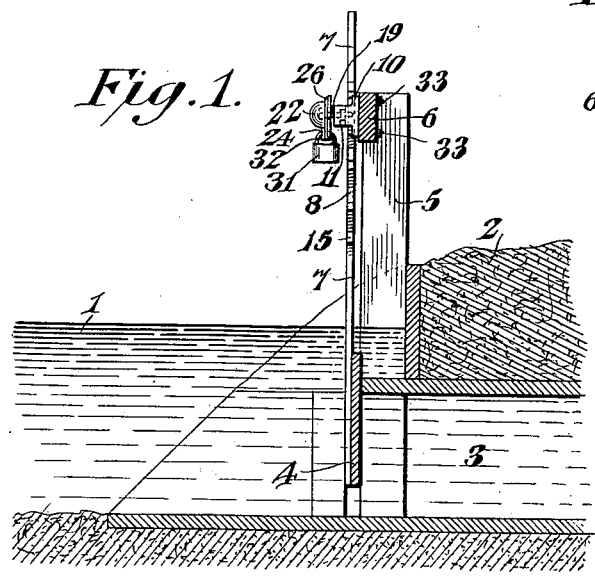
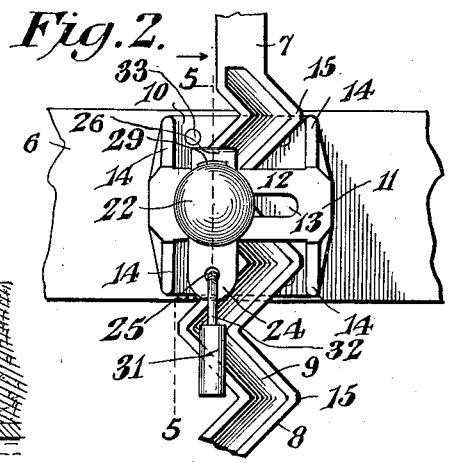
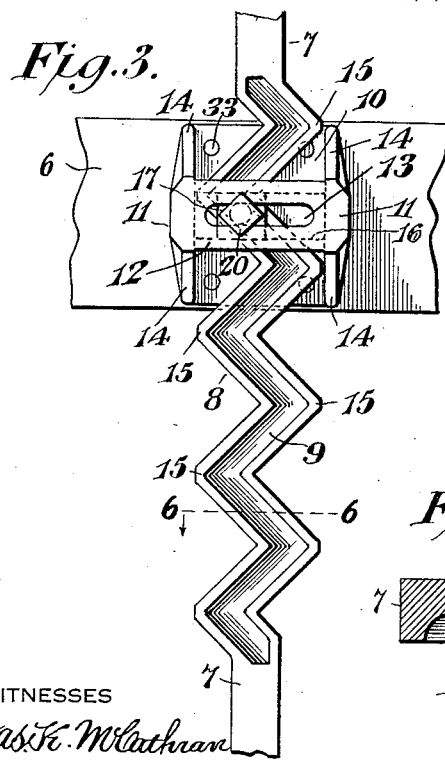
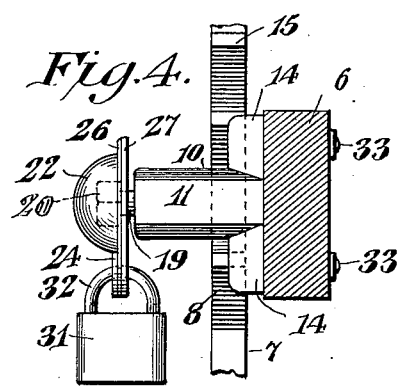
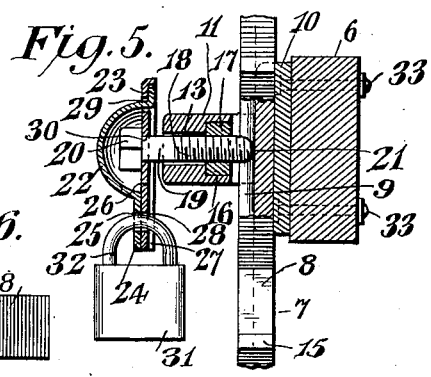
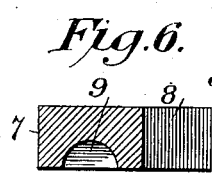
Frederick N. Cronholm, INVENTOR

UNITED STATES PATENT OFFICE.

FREDERICK N. CRONHOLM, OF RUPERT, IDAHO.

LOCKING MEANS FOR GATES OF IRRIGATING-CANALS.

1,095,455.  Specification of Letters Patent.  Patented May 5, 1914.

Application filed August 28, 1913. Serial No. 787,142.

*To all whom it may concern:*

Be it known that I, FREDERICK N. CRONHOLM, a citizen of the United States, residing at Rupert, in the county of Minidoka and State of Idaho, have invented a new and useful Locking Means for Gates of Irrigating-Canals, of which the following is a specification.

This invention has reference to improvements in locking means for gates of irrigating canals, and its object is to provide a device for the purpose, whereby accurate adjustments may be made without the possibility of change of the adjustments except the gate be unlocked by an authorized person. In locking devices for the purpose as heretofore employed, and particularly with respect to those in actual practice, it is not possible to make accurate adjustments, since the gates may be locked only at predetermined points, for which reason the accumulated waste for many tap boxes is very great and is a matter of material moment in arid regions, such as are found in the western portion of the United States. The irrigating canal must in may instances carry water that is diverted to hundreds of farms along its length, wherefore it is of moment that the proper amount be diverted to each lateral without waste, and at the same time give to each water user his just dues. While wastage from seepage and evaporation is unavoidable, unnecessary waste is avoided by the present invention since accurate adjustment of the gate is readily brought about and each user is assured of the amount of water to which he is entitled, within very narrow limits.

Under prevailing conditions of water distribution adjacent farm units having the same surface and subsoils and raising the same kind of crops will at the end of the irrigation season have used different total amounts of water. The time has arrived however, when water for irrigation purposes will be sold by the acre-foot or fraction thereof, rather than by the season or for a perpetual water right. Hence, if a user demands a certain number of second feet because he feels that he needs it and is entitled to its use, the distributer is bound to give it to him, but with the means at hand the distributer has to give the user more than he demands because the nearest adjustment possible or practicable gives too much and hence the over amount is mere waste.

The present invention has to do mostly with small head gates that may be raised by hand and which do not require gearing, and yet provides a means for the accurate adjustment of the amount of water supplied, and, furthermore, it cannot be changed by the maliciously inclined.

The invention comprises a crooked stem carrying the gate with means for engaging the stem at any point to hold it in the desired position, which means is of great simplicity and may be as simple as a jam bolt, while provision is made for locking the bolt against manipulation while the crooked stem effectively prevents any movement of the stem as by blows imparted thereto.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a longitudinal section of a lateral and a small portion of a supply canal with a gate provided with a locking means constructed in accordance with the present invention. Fig. 2 is a face view on a larger scale of the locking structure. Fig. 3 is a view similar to Fig. 2 but omitting a portion of the locking structure. Fig. 4 is a side view on the scale of Figs. 2 and 3, with some parts in section and showing the locking structure of Fig. 2. Fig. 5 is a section on the line 5—5 of Fig. 2. Fig. 6 is a section on the line 6—6 of Fig. 3 but drawn on a larger scale.

Referring to the drawings there is shown in Fig. 1 a more or less schematic representation of a supply canal 1 and also indicating a portion of the canal bank 2 and a lateral 3, and as these parts may follow the usual practice no particular description thereof is needed. The lateral 3 has a gate 4 which may be of a character and mounted for hand manipulation, and rising from that portion of the lateral supplied by the gate 4 is a frame composed of side posts 5 and a cross piece 6, but these features do not in themselves enter into the present invention and may be changed and modified as conditions demand. The gate 4 is provided with a carrying stem 7 which for a distance may be straight and includes another portion 8 of zigzag or sinuous configuration, and along one face of this zigzag portion 8 there is produced a groove 9 of like configuration.

Fast to the cross beam 6 is a plate 10 having side posts 11 projecting therefrom, and these side posts are connected by a bridge piece 12 in spaced relation to the plate 10 and provided with a longitudinal slot 13 of sufficient length to comprehend the lateral extent of the zigzag groove 9.

The plate 10, posts 11 and bridge 12 may be in the form of a single casting, and these posts may be located about midway of the ends of the plate 10 and from each side of each post to the corresponding ends of the plate there are formed flanges 14 outstanding from the plate for a distance toward the bridge piece 12. The inner wall of each post 11 and the corresponding flanges 14 are in alinement, and those on one side of the plate 10 are spaced from those on the other side a distance to permit the passage between them of the zigzag portion 8 of the stem 7, while the length of the plate 10 from top to bottom, it being understood that the stem 7 is upright in practice, is so related to the zigzag part 8 that there are always two opposite angular portions 15 of the zigzag part in engagement with the opposite walls formed by the posts 11 and flanges 14 and which may, therefore, be called guide walls for the zigzag part 8 of the stem.

The bridge 12 is formed on the inner face, that is, the face toward the plate 10, with a longitudinal recess 16 of a length which may be somewhat greater than the length of the slot 13 and is of a width and depth to accommodate a nut 17 through which nut is passed a treaded stem 18 constituting a portion of a bolt 19, and the latter has at the end remote from the threaded stem a head 20 of square or hexagonal or other appropriate shape for the application of a tool. That end of the stem 19 remote from the head 20 is rounded, as indicated at 21, or otherwise suitably shaped to enter the groove 9, which latter may also be of rounded cross section, such shape facilitating the operation of the bolt, which bolt in action resembles a set screw more than a bolt, and may be so termed. The stem of the bolt or set screw 19 is related to the slot 13 to pass freely therethrough, while the threaded portion 18 is adapted to the nut 17. Now, when any part 8 of the stem 7 is in the guide plate 10, the bolt or set screw 19 may be screwed in a direction to bring the end 21 into the groove 9 in clamping relation thereto, the nut 17 seating firmly against the bridge piece 12 in the recess 16. If it be desired to move the stem 7 the set screw is loosened and such movement of the stem is made as is desired, the nut and set screw moving or reciprocating in the slot 13 to such extent as demanded by the movement of the zigzag portion 8 of the stem 7, and when the desired adjustment has been attained the set screw is once more tightened, thereby holding the stem against longitudinal movement and the gate 4 is thus locked, so far as the set screw is concerned, in the adjusted position. Now, because of the zigzag or angular relation of the groove 9 to the length of the stem 7, any attempt to move the stem lengthwise when locked by the set screw 19 is futile because no force, short of a destructive force, applied to the stem will cause its longitudinal movement against the resistance offered by the set screw 19, although were the groove 9 straight or in alinement with the stem 7 blows might be imparted to the stem and cause a movement thereof in a direction to open or close the gate. The zigzag shape of the groove 9, however, effectively overcomes any tendency of the stem 7 to move in the direction of its length, even though blows be imparted thereto. This is especially the case where the rounded end 21 of the set screw 19 fits the groove 9 quite closely.

To any one provided with a suitable tool the bolt or set screw 19 might easily be turned to loosen the stem, so in order to prevent any manipulation of the bolt or set screw there is a cap member 22 in the shape of a cup of a size to receive and house the head 20 of the bolt 19. This cup member has at one side a bent lip 23 and at the other side an extension 24 having a passage 25 therethrough. There is also provided an elongated plate 26 stiffened by a marginal flange 27 on one face, and this plate is provided with a passage 28 matching the passage 25 and with a slot 29 at the end remote from the passage 28 to receive the bent lip 23. Moreover, the plate 26 has an intermediate opening 30 of a size to permit the passage of the shank portion of the bolt or set screw 19, but too small to permit the passage of the head 20. The plate 26 is threaded on to the set screw 19 before the latter is screwed through the nut 17, but its presence does not interfere with the manipulation of the bolt or set screw. When such set screw has been so adjusted as to lock the stem 7 in the desired position, the cap member 27 is applied by first inserting the lip 23 through the slot 29 and then bringing the tongue 24 against the corresponding portion of the plate 26, thus completely housing the head 20 of the set screw 19. When this is accomplished a lock 31, which may be a hasp lock, or of any other suitable type, is applied by passing its hasp 32 through the then matching openings 25 and 29 and the cap 22 is then securely locked in position against accidental or malicious removal. The parts are so proportioned that when the set screw is in the locking position there is sufficient space between the bridge piece 12 and the plate 26 to prevent binding, but this space is too small to permit the application of any tool to the set screw 19 which would admit of turning the set screw.

By providing suitable locks 31 only a person supplied with a proper key, and it is assumed that only authorized persons are so supplied, can change the gate 4, but such a person may change the gate to any desired degree without being confined to steps of predetermined length. Moreover, the operator is assured that the gate will remain in the finally adjusted position so that the water supplied can be determined with substantial accuracy, which will eliminate all preventable waste.

The guide plate 10 is secured to the cross beam 6 in any suitable manner, as, for instance, by bolts 33 which may be riveted after application to prevent removal or any other suitable fastening means which may be applied in a manner preventing removal can be used. The guide plate prevents any lateral movement of the stem because the zigzag portion of the stem fits between the guiding flanges quite closely.

What is claimed is:—

1. In a locking means for gates of irrigating canals, the combination with a gate, of a stem therefor having a zigzag or sinuous portion provided with a similarly shaped groove, a guide member for the zigzag portion, and a locking member carried by the guide member in position to engage in the zigzag portion.

2. In a locking means for gates of irrigating canals, the combination with a gate, of a stem therefor having a zigzag or sinuous portion provided with a similarly shaped groove, a guide member for the zigzag portion, and a locking member carried by the guide member in position to engage in the zigzag portion, said guide member being shaped with relation to the zigzag portion to permit longitudinal movement and prevent lateral movement thereof.

3. In a locking means for gates of irrigating canals, the combination with a gate, of a stem therefor having a zigzag or sinuous locking member, a guide member therefor and coacting locking means carried by the guide member for engaging the sinuous locking means of the stem.

4. In a locking means for gates of irrigating canals, the combination with a gate, of a stem therefor having a zigzag or sinuous locking member, a guide member therefor and coacting locking means carried by the guide member for engaging the sinuous locking means of the stem, the guide member being shaped to permit a movement of the locking means carried thereby in a direction transverse to the length of the stem to conform to the sinuosities of the locking member of the stem.

5. In a locking means for gates of irrigating canals, the combination with a gate of a stem therefor having a portion provided with a zigzag groove, a guide plate therefor having spaced flanges for the passage of the grooved portion of the stem, a bridge piece in spaced relation to the guide plate and provided with a longitudinal slot extending in a direction transverse to the length of the stem, said bridge piece having a recess or channel on the side toward the plate, a nut adapted to the recess or channel and movable therein, and a bolt or set screw traversing the nut and shaped to engage in the sinuous groove of the stem.

6. In a locking means for gates of irrigating canals, the combination with a gate, of a stem having a zigzag groove, guide means for the portion of the stem provided with the zigzag groove, a locking bolt or screw carried by the guide means in position to engage in the zigzag groove, and a cap member for the head of the bolt having a removable portion shaped to house the head of the bolt or screw and in turn provided with means for locking it in the housing position.

7. In a locking means for gates of irrigating canals, the combination with a gate, of supporting means therefor, means for coacting with the supporting means for locking the gate in any desired position of adjustment, said locking means including a headed screw or bolt, and means for preventing manipulation of the bolt comprising a cap member and support therefor for housing the head of the bolt, and locking means for said cap member.

8. In locking means for gates of irrigating canals, the combination with a gate, of a supporting stem therefor, means for engaging and locking the stem in different positions of adjustment and including a headed bolt or screw, a plate carried by the stem of the screw and provided with a passage for said stem too small to permit the passage of the head of the screw and also provided with other passages, and a cap member of a size to inclose the head of the screw and provided with a lip adapted to one of the passages of the plate and with an extension having a passage therethrough matching the other passage in the plate for the application of a lock to the cap member and plate when in operative position.

9. In locking means for gates of irrigating canals, the combination with a gate, of a supporting stem therefor having a zigzag portion with a groove therein of like configuration, a guide plate having side flanges and a connecting bridge piece with a longitudinal slot therethrough and a recess on the side toward the plate, the flanges of the plate being spaced in accordance with the lateral extent of the zigzag portion of the stem and of a length to include a plurality of angles of the zigzag portion, a nut adapted to the recess of the bridge piece, and a bolt or screw having a manipulating head at one end and at the other end shaped to enter the groove in the stem, said bolt or screw traversing the nut.

10. In locking means for gates of irrigating canals, the combination with a gate, of a supporting stem therefor having a zigzag portion with a groove therein of like configuration, a guide plate having side flanges and a connecting bridge piece with a longitudinal slot therethrough and a recess on the side toward the plate, the flanges of the plate being spaced in accordance with the lateral extent of the zigzag portion of the stem and of a length to include a plurality of angles of the zigzag portion, a nut adapted to the recess of the bridge piece, and a bolt or screw having a manipulating head at one end and at the other end shaped to enter the groove in the stem, said bolt or screw traversing the nut, and means for preventing manipulation of the bolt or screw comprising a plate mounted on the shank of the bolt, and a cap member shaped to engage the plate in housing relation to the head of the bolt, the plate and cap member being also shaped for the application of a lock thereto when in the operative position.

In testimony, that I claim the foregoing as my own, I have hereto affixed my signature in the presence of two witnesses.

FREDERICK N. CRONHOLM.

Witnesses:
H. B. REDFORD,
E. R. DAMPIER.

---

Copies of this patent may be obtained for five cents each, by addressing the "Commissioner of Patents, Washington, D. C."